United States Statutory Invention Registration [19]

[11] Reg. Number: H621

Day

[43] Published: Apr. 4, 1989

[54] FLAVOR MODIFICATION OF DISTILLED SPIRITS

[75] Inventor: Gary A. Day, Decatur, Ill.

[73] Assignee: A. E. Staley Manufacturing Company, Decatur, Ill.

[21] Appl. No.: 173,521

[22] Filed: Mar. 25, 1988

[51] Int. Cl.[4] ..... C12G 3/06; A23G 3/00

[52] U.S. Cl. ..... 426/592; 426/658

[58] Field of Search ..... 426/658, 592

[56] References Cited

U.S. PATENT DOCUMENTS

| | | | |
|---|---|---|---|
| 239,561 | 3/1881 | Shields | 426/592 |
| 686,978 | 11/1901 | Kiefer | 426/592 |
| 723,496 | 3/1903 | Stadtegger | 426/592 |
| 740,519 | 10/1903 | Brandner | 426/592 |
| 1,037,783 | 9/1912 | Lutters | 426/592 |
| 3,883,365 | 5/1975 | Forsberg et al. | 127/60 |
| 3,928,062 | 12/1975 | Yamauchi | 127/60 |
| 4,199,374 | 4/1980 | Dwivedi et al. | 127/60 |
| 4,303,684 | 12/1981 | Pitchon et al. | 426/312 |
| 4,414,231 | 11/1983 | Ficca | 426/271 |
| 4,497,842 | 2/1985 | Ehrlich et al. | 426/592 |
| 4,517,021 | 5/1985 | Schollmeier | 127/30 |
| 4,643,773 | 2/1987 | Day | 127/30 |
| 4,676,988 | 6/1987 | Efstathiou et al. | 426/271 |
| 4,676,991 | 6/1987 | Batterman | 426/590 |
| 4,710,231 | 12/1987 | Batterman | 427/30 |
| 4,724,006 | 2/1988 | Day | 127/30 |
| 4,737,368 | 4/1988 | Batterman | 426/660 |

OTHER PUBLICATIONS

Anon. Crystalline Fructose: A Breakthrough in Corn Sweetener Process Technology Food Technology, Jan. 1987, pp. 66, 67 and 72.

Kirk-Othmer, Encyclopedia of Chemical Technology, vol. 3, pp. 830-862, (John Wiley & Sons, 3rd ed., 1978).

Grossman's Guide to Wines, Beer and Spirits, pp. 303-308, (Charles Scribner's Sons, 6th Ed., 1977).

*Primary Examiner*—John F. Terapane

*Assistant Examiner*—J. E. Thomas

[57] ABSTRACT

A method of modifying the flavor of distilled spirits is provided. Crystalline fructose (optionally with crystalline dextrose) or aqueous solutions thereof are added to distilled spirits in minor amounts, e.g. less than 5% by weight, to modify the flavor thereof. The method is particularly applicable to distilled spirits containing natural flavor components, i.e. congeners, from distillation or maturation of the spirit. The addition of minor amounts of fructose serves to improve the palatability of the distilled spirit without overtly sweetening or undesirably masking the original flavor.

15 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLAVOR MODIFICATION OF DISTILLED SPIRITS

FIELD OF THE INVENTION

This invention relates to a method of modifying the flavor of distilled spirits and to a composition comprised of distilled spirits and a flavor modifier.

BACKGROUND OF THE INVENTION

The production of distilled spirits from fermented sugars dates back to antiquity. The first distiller was probably a Greek or Egyptian alchemist who boiled wine in a crude still. The practice of distilling spirits from fermented sugars to produce potable spirits has been found in many different cultures throughout the world.

While rum, the distillate of fermented molasses, was probably the most important product of colonial New England, the rum industry in North America slowly declined thereafter in favor of whisky. Whisky is an alcoholic distillate from a fermented mash of grain distilled at less than 190° proof (i.e. 95% alcohol by volume) in such a manner that the distillate possesses the taste, aroma, and characteristic generally attributed to whisky.

The particular taste, aroma, and character of a distilled spirit is due primarily to substances other than alcohol which are produced during fermentation and maturation, known in the art as congeners. The distilling and maturation processes are manipulated by distillers and bottlers to obtain the proper mix and level of congeners in the distilled spirit needed to produce the desired aroma, taste, etc. of the distilled spirit. Congeners are generally higher alcohols, organic acids, esters, aldehydes, tannins, and the like which are contained in various distilled spirits in various amounts. The amounts of congeners in relatively heavy-bodied liquors, e.g. whisky, are much greater than beverages having a lighter body, e.g. grain neutral spirits (spirits distilled from grain at over 190° proof) and vodka (distilled spirits defined as treated to be without character aroma or taste other than that of ethanol itself).

Over the past half-century, consumer preference in the United States has shifted from heavy-bodied distilled spirits to distilled spirits having a lighter body as evidenced by the tremendous growth in consumption of vodka. See Kirk-Othmer, *Encyclopedia of Chemical Technology,* Vol. 3, p. 836 (John Wiley & Sons, Inc., 3d ed. 1978). With this change in consumer preference, it would be desirable to modify the flavors of distilled spirits so as to make the distilled spirit more palatable for those who prefer a lighter-bodied beverage.

Distilled spirits have been flavored with sweeteners and other flavorings to obtain highly flavored cordials or liqueurs. For example, U.S. Pat. No. 4,497,842 (Ehrlich et al.) discloses extracted roasted citrus peel with aqueous ethanol, e.g. a distilled alcoholic beverage of about 70 to about 120 proof such as brandy, whisky, vodka, gin, etc., and sweetening the resulting bitter liquor, e.g. with fructose, to make a cordial. The patent to Ehrlich et al. states that the extract is very bitter and may require from 5 to 50 parts or more fructose per part of cordial, although the only example discloses using from 5 to 14 parts of fructose per 100 parts of extract. Although the patent to Ehrlich et al. teaches the use of fructose, it does not specify the form of fructose and it specifically states that the extract is bitter and needs much sweetening which implies that a heavy-bodied beverage would result.

SUMMARY OF THE INVENTION

This invention relates to a method of modifying the flavor of a distilled spirit comprising mixing a major amount by weight of a distilled spirit with a minor amount by weight of a saccharide composition consisting essentially of a member selected from the group consisting of crystalline fructose, aqueous solutions thereof, mixtures of crystalline fructose and crystalline dextrose, and aqueous solutions thereof, said minor amount being less than 5% by weight of the resulting mixture.

This invention also relates to a beverage composition comprising a major amount by weight of a distilled spirit and a minor amount by weight of a saccharide composition consisting essentially of a member selected from the group consisting of crystalline fructose, aqueous solutions thereof, mixtures of crystalline fructose and crystalline dextrose, and aqueous solutions thereof said minor amount being less than 5% by weight of the resulting mixture.

Attempts to use a high fructose corn syrup (HFCS) to modify the flavor of a whisky resulted in the formation of haze in the whisky, an undesirable result that may have been due to the presence of small amounts of residual higher saccharides, i.e. polysaccharides and/or residual proteins, in the HFCS. The use of crystalline fructose or an aqueous solution thereof avoided haze formation and gave a lighter flavored beverage that still retains most of the aroma, taste, and other characteristics of the original beverage.

DETAILED DESCRIPTION OF THE INVENTION

The method of this invention generally involves mixing a distilled spirit with a small amount of crystalline fructose, mixtures of crystalline fructose and crystalline dextrose, or aqueous solutions thereof.

The crystallization of fructose is disclosed in U.S. Pat. Nos. 3,883,365 (Forsberg et al.), 3,928,062 (Yamauchi), 4,199,374 (Dwivedi et al.), and 4,643,773 (Day). Crystalline fructose is to be distinguished from materials containing significant amounts of amorphous fructose or corn syrup by-products, e.g. the semi-crystalline fructose disclosed in U.S. Pat. No. 4,517,021 (Schollmeier). Crystalline fructose is available commercially at a purity in excess of 99.0% as the anhydrous crystalline form of $\beta$-D-fructose, for example, Krystar TM brand crystalline fructose available from A. E. Staley Manufacturing Division of Staley Continental, Inc., Decatur, Illinois. Crystalline dextrose is available commercially in the anhydrous or monohydrate crystalline form. The crystalline fructose and crystalline dextrose can be mixed with the spirit separately or premixed together before mixing with the spirit. The amount of crystalline fructose as a percentage by weight of the saccharides of the saccharide composition will generally be at least about 42%, preferably at least about 55%, and most preferably at least about 98%. Aqueous solutions of crystalline fructose are easily prepared, even at relatively high solids, e.g. 70% to 80% dry solids by simply mixing crystalline fructose with potable water. The mixture can be heated above ambient temperature, but such heating should not generally be necessary.

The amount of saccharide mixed with the distilled spirit will be a very minor amount, generally less than 5% by weight of the distilled spirit, typically less than about 2.5%, e.g. 0.1% to about 2% by weight. Such an amount should generally be sufficient to only subtly modify the flavor of the distilled spirit as opposed to overtly sweetening and/or flavoring the same. Because of the high solubility of crystalline fructose in alcohol and the relatively minor amounts of saccharide used, any effect on the color and/or clarity of the distilled spirit should be imperceptible.

The distilled spirits whose flavor can be modified by the practice of this invention are otherwise conventional and include a variety of naturally flavored distilled spirits, naturally flavored as opposed to cordials and liqueurs which generally contain significant amounts of added sweeteners and/or flavorings from fruits, flowers, herbs, spices, e.g. from juices, peels, leaves, roots and seeds. The proof of the distilled spirits will generally be at least about 80° (i.e. 40% by volume alcohol).

While this invention encompasses the modification of the flavor of gin, brandy, fruit brandies, grain neutral spirits, and even vodka, the invention is probably most advantageously employed in the modification of the flavor of whisky. Whisky used in this sense is intended to be generic to "whisky" as defined in Title 27, Code of Federal Regulations (i.e. an alcoholic distillate from a fermented mash comprised of grain distilled at less than 190° proof (95% by volume) in such a manner that the distillate possesses the taste aroma and characteristics generally attributed to whisky), as well as light whisky, rye whisky, bourbon whisky, wheat whisky, malt whisky, rye malt whisky, straight whisky and blended whisky. The definitions, properties, and methods of production of distilled spirits is discussed in Kirk-Othmer, *Encyclopedia of Chemical Technology,* vol. 3, pp. 830–862 (John Wiley & Sons, Inc. 3d ed., 1978) and *Grossman's Guide to Wines, Beers and Spirits* (Charles Scribner's Sons, 6th ed. 1977) the disclosures of which are incorporated by reference. The production of whisky generally involves the mashing of milled grain (i.e. gelatinization and saccharification of the starch therein), fermentation of the mash, distillation of the fermented mash, and maturation of the distillate in charred wooden casks or barrels.

The distilled spirits of this invention will have utility primarily as beverages and will be consumed neat, or with ice, soda or mixers, e.g. as cocktails, long drinks, and the like. Because of the purity and solubility of the crystalline fructose, the distilled spirit should have excellent flavor, color and clarity over long periods of storage.

EXAMPLES

A sample of anhydrous crystalline fructose (Krystar TM brand crystalline fructose available from A. E. Staley Manufacturing Division of Staley Continental, Inc.) was used to prepare a 70%+80% dry solids solution of pure fructose. This solution was blended with a premium bourbon whisky at a level of from 0.1% to 5% based upon the weight of the whisky. No formation of haze or precipitate was observed.

What is claimed is:

1. A method of modifying the flavor of a distilled spirit comprising mixing a major amount by weight of a distilled spirit with a minor amount by weight of a saccharide composition consisting essentially of a member selected from the group consisting of crystalline fructose, aqueous solutions thereof, mixtures of crystalline fructose and crystalline dextrose, and aqueous solutions thereof, said minor amount being less than 5% by weight of the resulting mixture.

2. A method of claim 1 wherein said minor amount is less than 2.5% by weight of said mixture.

3. A method of claim 1 wherein said distilled spirit is comprised of a member selected from the group consisting of alcohols having more than two carbon atoms, organic acids, esters, aldehydes and tannins.

4. A method of claim 1 wherein said distilled spirit is a whisky.

5. A method of claim 1 wherein said distilled spirit is an aged spirit.

6. A method of claim 1 wherein said distilled spirit has a proof of at least 80°.

7. A method of claim 1 wherein said saccharide composition consists of crystalline fructose or an aqueous solution thereof.

8. A method of claim 1 wherein said saccharide composition is an aqueous solution consisting of fructose.

9. A beverage composition comprising a major amount by weight of a distilled spirit and a minor amount by weight of a saccharide composition consisting essentially of a member selected from the group consisting of crystalline fructose, aqueous solutions thereof, mixtures of crystalline fructose and crystalline dextrose, and aqueous solutions thereof, said minor amount being less than 5% by weight of the resulting mixture.

10. A composition of claim 9 wherein said minor amount is less than 2.5% by weight of said mixture.

11. A composition of claim 9 wherein said distilled spirit is comprised of a member selected from the group consisting of alcohols having more than two carbon atoms, organic acids, esters, aldehydes and tannins.

12. A composition of claim 9 wherein said distilled spirit is a whisky.

13. A composition of claim 9 wherein said distilled spirit is an aged spirit.

14. A composition of claim 9 wherein said distilled spirit has a proof of at least 80°.

15. A composition of claim 9 wherein said saccharide composition consists of crystalline fructose or an aqueous solution thereof.

* * * * *